United States Patent
Armstrong et al.

(10) Patent No.: US 7,843,811 B2
(45) Date of Patent: Nov. 30, 2010

(54) METHOD OF SOLVING A SPLIT-BRAIN CONDITION

(75) Inventors: Joseph W. Armstrong, Santa Cruz, CA (US); Shu-Ching Hsu, Fremont, CA (US); Sreekanth Miriyala, San Jose, CA (US)

(73) Assignee: Fujitsu Siemens Computers, Inc., Sunnyvale, CA (US)

( * ) Notice: Subject to any disclaimer, the term of this patent is extended or adjusted under 35 U.S.C. 154(b) by 938 days.

(21) Appl. No.: 11/101,720

(22) Filed: Apr. 7, 2005

(65) Prior Publication Data

US 2005/0268153 A1     Dec. 1, 2005

Related U.S. Application Data

(63) Continuation of application No. PCT/DE2003/010985, filed on Oct. 2, 2003.

(60) Provisional application No. 60/416,783, filed on Oct. 7, 2002.

(51) Int. Cl.
*G01R 31/08* (2006.01)
*G06F 11/00* (2006.01)

(52) U.S. Cl. ............... 370/221; 370/242; 370/248; 714/4

(58) Field of Classification Search ........... 370/242
See application file for complete search history.

(56) References Cited

U.S. PATENT DOCUMENTS 6,192,401 B1 * 2/2001 Modiri et al. ............ 709/220

| | | | |
|---|---|---|---|
| 6,363,495 B1 | 3/2002 | MacKenzie et al. | |
| 6,467,050 B1 * | 10/2002 | Keung | 714/27 |
| 6,920,580 B1 * | 7/2005 | Cramer et al. | 714/4 |

(Continued)

FOREIGN PATENT DOCUMENTS

EP     1 117 039 A     7/2001

(Continued)

OTHER PUBLICATIONS

Fujitsu Siemens Computers, PRIMECLUSTER for mySAP Business Suite, Shutdown Facility (SF) (Linux), Configuration and Administration Guide, pp. 1-70, Oct. 2003.

(Continued)

*Primary Examiner*—Daniel J Ryman
*Assistant Examiner*—John Blanton
(74) *Attorney, Agent, or Firm*—Cohen Pontani Lieberman & Pavane LLP (57) ABSTRACT

In a cluster system comprising at least two nodes connected via a communication network and having a name and a host weight assigned to it, a method is implemented comprising the steps of inspecting the communication link, determining which node has to be shut down after a failure, creating an advertisement report for the node to be shut down, sending the advertisement report to at least one node of the cluster system, calculating a delay time depending on the weight of the first node and sending the shut down command to the node for which a failure report was received. In one embodiment of the invention the advertisement reports include a master node, which allows identifying and specifying the surviving subcluster. The method will send shut down signals to those nodes of a subcluster with lower weight than the surviving subcluster. A failsafe mechanism is implemented.

14 Claims, 5 Drawing Sheets

U.S. PATENT DOCUMENTS

| | | | |
|---|---|---|---|
| 7,076,783 B1 * | 7/2006 | Frank et al. | 719/313 |
| 7,197,660 B1 * | 3/2007 | Liu et al. | 714/4 |
| 7,228,453 B2 * | 6/2007 | O'Brien et al. | 714/13 |
| 2003/0159084 A1 * | 8/2003 | Murphy et al. | 714/13 |
| 2004/0088412 A1 * | 5/2004 | John et al. | 709/226 |

FOREIGN PATENT DOCUMENTS

| | | | |
|---|---|---|---|
| EP | 1 117 039 A2 | 7/2001 |
| EP | 1 117 040 A | 7/2001 |
| EP | 1117040 A2 | 7/2001 |

OTHER PUBLICATIONS

Fujitsu Siemens Computer: "Primecluster for mySAP Business Suite, Shutdown Facility (SF) (Linux), Configuration and Administration Guide", White Paper, Oct. 2003, pp. 1-70.

* cited by examiner

METHOD OF SOLVING A SPLIT-BRAIN CONDITION

RELATED APPLICATION

This is a continuation of International Application No. PCT/DE2003/010985, filed on Oct. 2, 2003, which claims priority from U.S. provisional application Ser. No. 60/416,783 filed Oct. 7, 2002, the contents of which is hereby incorporated by reference.

FIELD OF THE INVENTION

The invention relates to a method in a cluster system comprising a first and at least one second node, said nodes being connected to a communication network and having a name and a host weight assigned to it, the method being implemented in at least one of the first and of the at least one second node.

BACKGROUND OF THE INVENTION

Computer cluster systems have individual computers called nodes which are connected via a communication network. The communication network allows them to establish a communication link or channel between two nodes. Often computer clusters also have a shared storage device which is connected to each of the nodes of the computer cluster. On those shared storage devices some data is stored which is used by more than one node in the cluster. To prevent data inconsistency, means for data transmission between the nodes and the shared devices are required. For example, if one node in the cluster writes data in a file on the shared storage device, a second node is not allowed to read that file until the first node has finished the writing process. In normal conditions the first node writing the data in the file of the shared device will tell the second node of the writing process, thereby preventing the second node from reading the now outdated file. This task is done via the working communication channel between the two nodes.

If one node in the computer cluster breaks down, it will normally stop using the shared device. Other nodes in the computer cluster can use the data on the shared device without the risk of data corruption. However, if the communication channel between two nodes breaks down such that the members of the cluster are still operating yet cannot communicate with each other, data corruption on the shared devices can occur. A breakdown of the communication channel is called a split-brain condition resulting in, say, two subclusters. In this case a node in one of the resulting subclusters might write data in the file on a shared storage device while a second node in the other resulting subcluster reads or writes the file at the same time. Thus, a breakdown of the communication channel might lead to uncoordinated activities on shared devices. Therefore, it is necessary to shut down one of the resulting subclusters completely.

A shut down process of a subcluster system is normally done by the nodes of a first subcluster sending shut down commands to the nodes of a second subcluster. However this can lead to the situation that a node of one subcluster is the target of multiple shut down requests that may cause panic and undesired crashes among the nodes receiving those requests. Furthermore, the members of the surviving subcluster might not be known prior to the beginning of the shut down attempts. This might lead to the situation that a non-optimal subcluster will survive, which is not able to handle all necessary applications running on the cluster system.

SUMMARY OF THE INVENTION

One object of the invention is to provide a method in a cluster system for a shut down process in a split-brain condition. The method should solve a split-brain condition with a remaining defined and determined subcluster.

This and other objects of the present invention are attained in accordance with one aspect of the present invention directed to a method implemented in a cluster system, comprising a first and at least one second node. The nodes are connected to a communication network and are able to communicate with each other via the communication network. Each of the nodes has a name and a host weight assigned to it. The method comprises the steps of:

a) Inspecting a communication link via the computer network between the first and the at least one second node;

b) Determining which of the at least one second node is to be shut after a failure message of the communication link via the communication network between the first and the at least one second node is received;

c) Creating a demand report for the at least one second node determined to be shut down;

d) Sending the demand report to at least one node of the cluster system comprising the first and the at least one second node;

e) Calculating a delay time depending at least on the weight of the first node;

f) Sending a shut down command to the at least one second node after the expiry of the calculated delay time.

This method introduces a particular order in which the shut down commands are sent. Each shut down command is sent after the expiry of a calculated delay time, which depends on at least the weight of the first node. Calculating the delay time will ensure that in a split-brain condition the subcluster with the greatest weight will automatically survive. Due to the demand reports sent by the first node it is also determined which is the optimum subcluster.

In one embodiment of the invention calculating a delay time depending on the weight of the first node includes calculating a delay time depending on the weight of the subcluster defined by or in the demand reports.

In another embodiment of the invention, inspecting the communication link comprises the steps of listening to a heartbeat message sent by the at least one second node over the communication link and setting a failure indicator if the heartbeat message of the at least one second node is not received during a specified amount of time. The heartbeat message, which in one embodiment is a periodic signal that is sent over the communication network which connects the first node and the at least one second node together. It is also sent over the communication link in said communication network, over which the first node and the at least one second node also communicate with each other. If the heartbeat message is not received during the specified amount of time, then the first node assumes that the communication link to the at least one second node is broken or down. The failure indicator set by the first node indicates that the at least one second node is to be shut down in order to prevent data corruption among the nodes of the cluster, and on a shared device especially.

In another embodiment of the invention, step b) of the method comprises the steps of waiting a specified amount of time after a failure of a communication link is received for an additional failure of a communication link between the first node and a second of the at least one second node, and then determining the at least one second node to be shut down. Waiting for other failure indicators prevents a wrong error indicator due to an overloading communication link. It further allows receipt of all failure indicators before determining the nodes to be shut down.

In a further embodiment of the invention, creating a demand report comprises also determining a node for which no failure of communication is supported as a master node. In this embodiment of the invention the first node will define a node of the computer cluster with a working channel as a master node. Defining a master node allows to specify and identify all nodes of a subcluster system easily and dynamically.

In another embodiment of this invention, the master node is the node with the lowest alphanumeric name for which no failure of communication is reported or received. Therefore, the first node will declare a working node with the lowest alphanumeric name as the master node. A second node, which declares a node with the same alphanumeric name as master node belongs to the same subcluster, if no failure indicator is reported for this node. This embodiment of the invention is an easy way to define and identify nodes in a subcluster system. Furthermore it allows dynamic change of the total cluster.

A further embodiment of the invention comprises the step of creating at least one list including the name of the first node, the name of the master node and the name of the at least one second node to be shut down. This list is preferably part of the demand reports. Therefore, the first node creates a report comprising a list including its name, the name of the master node determined in the previous step and the name of the node for which a failure message is received. It is preferred to create a demand report for each of the second nodes to be shut down. Such an embodiment will be preferable if there is more than one second node for which a failure message is received.

In another embodiment of the invention, the list of the demand report also includes the host weight of the first node. The host weight might include a machine weight and an user application weight based on applications executed on the first node.

In another embodiment, sending the demand report comprises sending the demand report to each node of the first and at least one second of the cluster. In this embodiment of the invention the demand report will be received by each node in the cluster. This allows each node to determine their own subcluster and also to calculate the total subcluster weight compared to the total cluster weight.

The calculated delay time in step e) can be set to zero, if the host weight assigned to the first node is greater than 50% of the total weight of the first and the at least one second node. Since the first node has the greatest weight of the total cluster system the first node can automatically begin to send shut down commands to the at least one second node determined to be shut down. The surviving subcluster which will include the first node will be the optimal subcluster.

In another embodiment of the invention, the delay time calculated in step e) of the inventive method is set to zero if the sum of the weight of the first node and the nodes for which no failure of communications received is greater than 50% of the total weight of the first node and the at least one second node.

In a further embodiment of the invention, the delay time is set to zero if the weight of the nodes which belong to the same subcluster exceeds 50% of the total cluster weight. Nodes which belong to the same subcluster have the same node declared as master node. In other words, if the weight of this subcluster exceeds 50%, then one of those nodes can start immediately sending shut down commands to the other nodes, for which a failure report is received.

In another embodiment of this invention, the shut down commands are sent to the at least one second node if an indicator signal is not received from the at least one second node indicating a shut down process. In that case a node will send a second shut down command if another node of the same subcluster which has a shorter delay time has not sent a successful shut down command to the at least one second node. If an indicator signal is therefore lacking the node must assume, that a problem occurred and the at least one second node has not performed a shut down process yet.

It is preferred to send the demands report via the UDP protocol. This protocol has less overhead than a normal TCP/IP protocol.

In another embodiment of the invention, all communication regarding the method is sent over an administrative network, which connects every node in the cluster system.

DETAILED DESCRIPTION OF THE DRAWINGS

Figure 1:
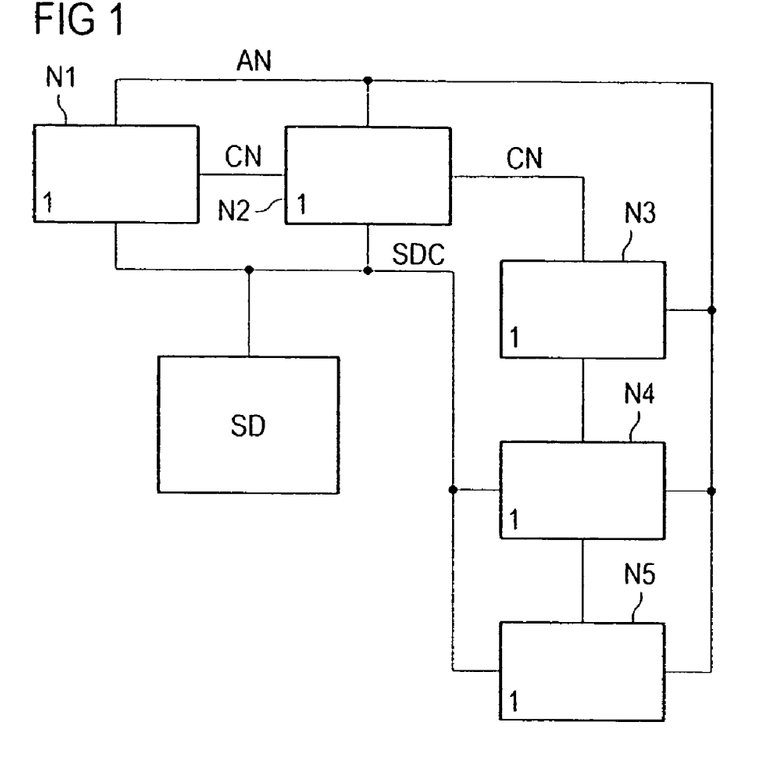
FIG. 1 shows a cluster system with five nodes, each including the inventive method.

FIG. 1 illustrates a typical cluster system with five separated cluster nodes N1 to N5 in which the inventive method is implemented. The cluster nodes N1 to N5 are normal computers having a central processor unit, a memory and at least one network card as well as a connection to a storage device SD. The network cards in each of the nodes N1 to N5 connect the nodes N1 to N5 to each other via a communication network. The communication network establishes a communication link CN among the nodes. The communication link is also called a cluster network which allows the nodes N1 to N5 of the computer cluster to communicate with each other. The communication link CN operates in cooperation with a software program called Cluster Foundation in each node, which works as a logical layer in each node and provides the basic cluster services on which all other modules are dependent upon. It provides functions used by other application programs. Without it the application programs on different nodes are not able to communicate with each other. (For example the Cluster Foundation provides CFIP a specific cluster form of the IP-protocol for communication).

The Cluster Foundation software is part of a product called Prime Cluster which is available from Fujitsu Siemens Computers. It is described in the "Prime Cluster Concept Guide", the content of which is hereby incorporated by reference. The Cluster Foundation software runs on each of those nodes and controls and monitors the communication between the nodes N1 to N5. The communication itself is performed over the Cluster Foundation IP protocol CFIP.

The term cluster software refers to all the software components, especially application programs, capable of using Cluster Foundation. Examples are well known to anyone ordinarily skilled in the art, and can include scaleable Internet services, "BeoWulf" cluster software, and MySAP products. Cluster software running on the nodes communicates over the CFIP and the communication link CN with other nodes.

Furthermore, the communication network includes an administration network AN which is also connected to each of those nodes. Commands not concerning the cluster software are sent over the administrative network AN. For example over the administrative network AN a system administrator can send shut down commands to one of those nodes. Furthermore each node of the cluster is connected to a shared storage device SD. Data are loaded from the storage device SD or written into the storage device SD via the storage device communication SDC.

Cluster software running on one of those nodes and communicating with other cluster software on other nodes are controlling the reading and writing on the storage device in a way that no data inconsistency or data corruption occurs. For example, if a cluster software running on node 2 tries to read a file from the shared storage device SD over the communication network SDC another cluster software on node N3 will not write data in that file until the read process is finished. The access to the shared storage device SD might also be controlled by the Cluster Foundation CF and the cluster foundation IP protocol CFIP on each of the cluster nodes.

Furthermore, each node in the cluster system has a name as well as a weight assigned to it. In this embodiment of the invention each of those N1 to N5 have the host weight 1. The weight is a measure of the importance of a specific node in the total cluster system. The total cluster weight is calculated adding the host weight of each node. In this embodiment of the invention the node N1 has the host weight 1 which is one-fifth of the total cluster weight. The host weight of N1 is based on the local machine weight which is given in this embodiment by the physical parameters of the host, for example CPU-type, memory size and so on. For example, a machine with a high speed CPU and lots of memory results in a high value, i.e., Pentium III with 1.2 GHz and 1 GB memory has a value of 100; a Pill with 1.2 GHz and 512 MB memory has a value of 75; a Pill with 800 MHz and 512 MB memory has a value of 50.

Furthermore the host weight includes a user application weight. The user application weight gives information about the applications executed on that specific node and includes also a user application weight. User application weight includes the importance of the application, eg an important application gets high value.

("nice" command under unix OS is similar)

eg: 2 hosts (=nodes), each comprising Pill with 1.2 GHz and 1 GB memory has a value of 100

Web server application has high priority with value=25, and is running on first node FTP server application has lower priority with value=15, and is running on second node Total value of first node: 100+25=125

Total value of second node: 100+15=115

This first node is more important.

The concept of application weight (for instance for CPU time) is well known and often used in standalone or cluster servers.

A user might define: second node is very important (see example above), and adds user value=30. Then the total value for the first node is 125 and for second node it is 145. Thus, the second node becomes more important.

Figure 2:
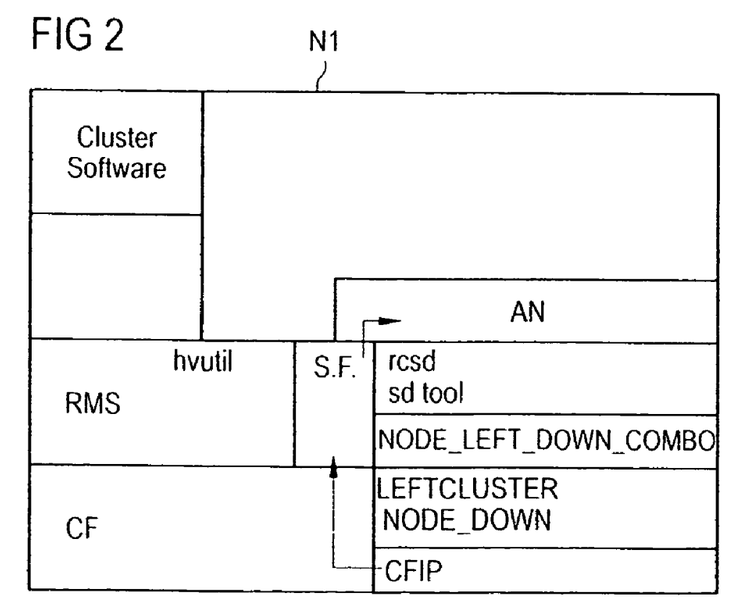
FIG. 2 gives an overview over the logical level structure of one node of this cluster.

FIG. 2 shows a sketch of a logical layer structure of the node N1. The other nodes N2 to N5 in the cluster of FIG. 1 will have the same layer structure. The node N1 includes the Cluster Foundation layer CF including the Cluster Foundation IP protocol CFIP which allows the cluster software to communication with each node. The Cluster Foundation CF also controls, maintains and monitors the cluster foundation IP protocol and the communication between the nodes. If a node shuts down due to an administrative shut down command for example, the Cluster Foundation CF of this node sends out a signal NODE_DOWN to indicate to all other nodes that the node N1 will shut down immediately. Cluster foundations CF on the other nodes will receive that NODE_DOWN signal and change their priority and, for example, take over the programs executed on the node.

This task of shaping priority and taking over the programs executed on the node is also performed by the next layer comprising a reliant monitoring system RMS, which is also part of the above-mentioned Prime Cluster product. The RMS is responsible for the high availability of user applications. If an application on one node crashes, the RMS has to start the application anew on the same or on another node in order to maintain high availability. Decision of the RMS is dependent on the weight of the application (important application or not), host weight (is host capable of executing the application) and user weight (user wants the application to be executed).

The reliant monitoring system starts and stops cluster software and also monitors the user application weight.

The same layer also includes also the shut down facility SF. The shut down facility SF receives failure messages from the cluster foundation CF if a communication link between one node and another node is broken. A broken communication is assumed to be a split-brain condition. Therefore, the shut down facility SF has to send a shut down command over the administrative network AN to the node to be shut down. It also sends out a signal NODE_LEFT_DOWN_COMBO to inform all remaining cluster nodes of the status change. Status change includes a message that a specific node does not answer and a split conditions has occurred. It includes information about the nodes to be shut down and the nodes remaining in the cluster. Furthermore SF receives a signal indicating the shut down progress by the node to be shut down.

Figure 3:
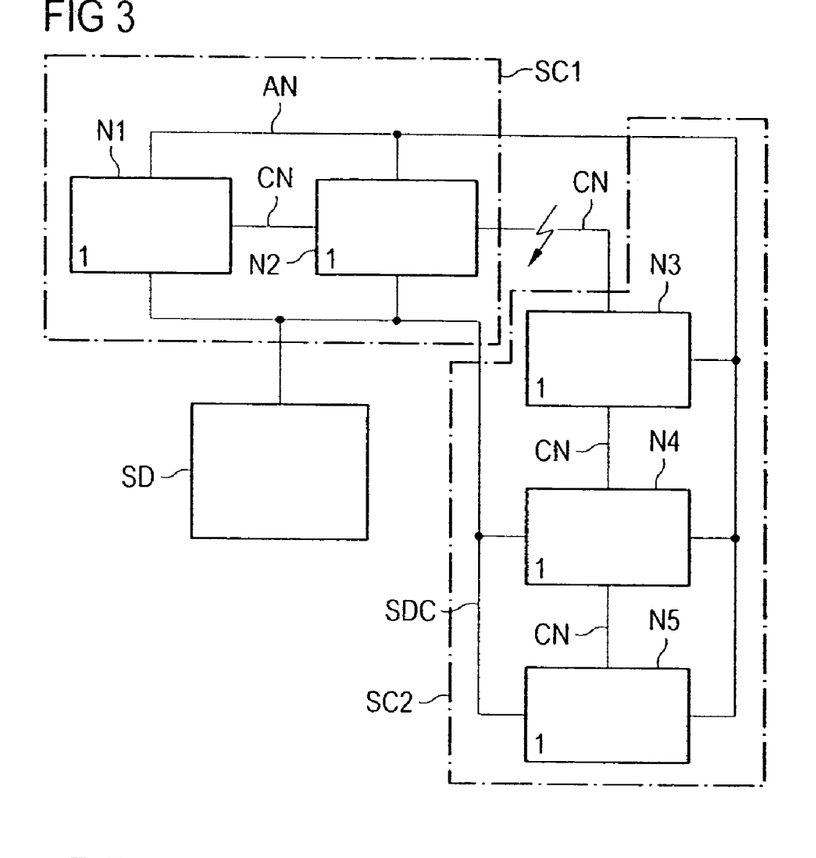
FIG. 3 shows the cluster structure with a broken communication link between nodes.

An example of a possible split-brain condition is shown in FIG. 3. In the example the cluster network has been split between node N2 and node N3. However, the shared device communication SDC is not split as well as the administrative network AN. This situation results in two subclusters which still share the same storage device SD. One subcluster SC1 consists of two nodes N1 and N2. The second subcluster SC2 consists of the nodes N3, N4 and N5. A cluster communication over the cluster IP protocol CFIP between node N1 and node N2, as well as among node N3, node N4 and node N5 is still possible. However, using the same shared devices SD leads to inconsistencies. Therefore, one of those subclusters has to be shut down.

Figure 8:
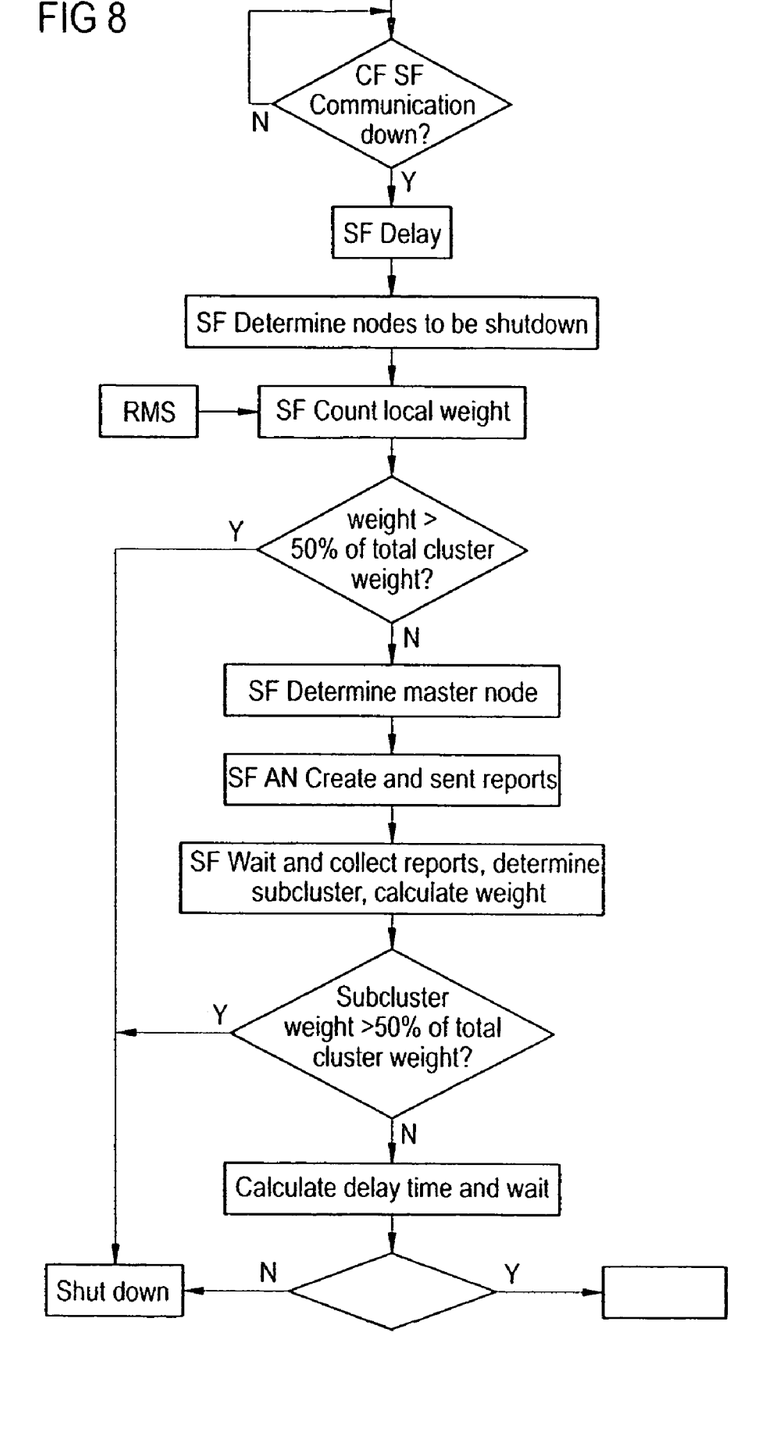
FIG. 8 shows a detailed illustration of the inventive method.

The method used by the Cluster Foundation CF and the shut down facility SF in the nodes is shown in FIG. 8. The inventive method is implemented in the shut down facility and is performed by a special program, which takes care of the shut down process. It can also be split in different programs or implemented in a different way. However, the method steps will be similar. The method of FIG. 8 is shown for node N1 for clearness only.

As mentioned earlier, the Cluster Foundation inspects the communication links. The Cluster Foundation CF sends over the communication link CN heartbeat messages to each of those nodes. As long as heartbeat messages are received from each of the other nodes the communication link CN is considered working and intact. If a heartbeat message from a specific node is not received over a specified amount of time it is assumed that the communication with that specific node is down. The specified amount of time can be changed by the CF due to heavy load in the communication link. In the example of FIG. 3, the nodes N1 and N2 will stop receiving heartbeat messages of N3 to N5. At around the same time nodes N3 to N5 will no longer receive any heartbeat messages of N1 and N2.

After the cluster foundation has determined a failed communication it creates a failure indicator signal and sends this failure indicator signal to the shut down facility SF. The shut down facility waits for a short period of time for outstanding and additional failure indicators. This delay by the shut down facility must be at least as long as the time between the receiving of two heartbeat messages by the cluster foundation. Additional failure indicators indicating that the communication with other nodes is also down are collected by the shut down facility during the delay time. In the example the shut down facility SF of node N1 will first receive a failure indicator for node N4 and then wait for another 1 to 2 second. It will shortly afterward receive the failure indicators of node N5 and N3 sent by the cluster foundation. On the other hand the cluster foundation CF of nodes N3 to N5 will create and send only two failure indicators to the shut down facilities SF on those nodes. One failure indicator indicates node N1 down, the other marks N2 as down.

After the delay, the shut down facility determines which nodes shall be shut down to solve the split-brain condition. The shut down facilities of nodes N1 and N2 in this example both declare nodes N3, N4 and N5 to be shut down. Likewise, the shut down facilities of nodes N3 to N5 declare node N1 and N2 to be shut down.

In the next step the shut down facility SF on each node calculates the local host weight. For this purpose it uses the reliant monitoring system RMS which provides a user application weight. It also has information about the local machine weight. This is given by a table list, which is stored on each node and have the same entries throughout the cluster. The sum of both weights is the total local host weight.

Total lcluser weight is the sum of all node weights, including the user application weight and their application weight. It is determined continously or periodically, eg after a change within the cluster, stored on each node in the RMS environment or on a shared storage device.

The shut down facility then determines whether the local weight is greater than 50% of the total cluster weight. If yes it can immediately start shutting down all other nodes in the cluster, which are to be shut down because even the sum of the weights of all nodes to be shut down cannot outrank its total local weight. This step can also be left out, or delayed. The nodes to be shut down are the nodes for which no heartbeat message was received.

If the local host weight is less than 50% of the total cluster weight, a shut down facility determines the master node of its subcluster. In this preferred embodiment of the invention the master node of a subcluster is the node with the lowest alphanumeric number or name, for which the communication link is still working. For example, in subcluster SC1 the node N1 has the lowest alphanumeric name and is considered as master of that subcluster. In subcluster SC2 node N3 is considered master of the subcluster.

The shut down facility SF of node N4 has received a failure indicator for nodes N1 and N2 but not for node N3. It therefore assumes that node N3 has still an active communication link and declares node N3 as master node for the subcluster SC2. The shut down facility SF of node N5 will come to the same conclusion, and the shut down facility SF of the node N3 will declare itself as master node.

In the subcluster SC1 the shut down facility of N2 will declare node N1 as master, and the shut down facility of node N1 will declare its own node as master node. The step of determining the master node of their subcluster and the step of calculating the total local host weight can also be reversed in sequence.

After the calculation of the total local host weight and the determination of the subcluster master node, the shut down facilities of each node will create a demand report for each node to be shut down of the other subcluster. In this embodiment the demand reports include the name of the local node, the name of the determined master node, the local host weight as well as the name of the node to be shut down. If the local host weight does not include a user application weight and is known due to the table entry, the weight can be left out. The demand reports are then sent over the administrative network AN to each of the other nodes of the total cluster.

The nodes N1 and N2 will send three demand reports with shut down requests for the nodes N3 to N5. The nodes N3 to N5 of the subcluster SC2 will send two demand reports. For example the three demand reports of node N2 will look similar to the example in the table below:

|  | Report 1 | Report 2 | Report 3 |
| --- | --- | --- | --- |
| Name of local node | N2 | N2 | N2 |
| Local host weight | 1 | 1 | 1 |
| Master node | N1 | N1 | N1 |
| Name of node to be shut down | N3 | N4 | N5 |

The shut down facility then waits for a specified amount of time for collecting the demand reports sent by the other nodes. The shut down facility of node N1 will receive a demand report for shutting down nodes N3 to N5 from node N2. In this embodiment the shut down facility of node N1 will also receive demand reports by the nodes N3 to N5 for shutting down nodes N1 and N2.

In the next step the shut down facilities of each node will, after collecting all the reports, determine the subcluster to which they belong. For this step they will use the declared master node in each report. The nodes which have declared the same node as master node are supposed to belong to the same subcluster. For example, the shut down facilities of N5 and N4 have declared the node N3 as their master. Therefore, the nodes N4 and N5 belong to the same subcluster SC2 as node N3. On the other hand, the nodes N1 and N2 which both declare node N1 as master node belong to the subcluster SC1.

After this step, the shut down facility calculates the subcluster weight. This is simply done by adding the local host clusters weight in each demand report sent by a node belonging to the same subcluster. If the subcluster weight exceeds 50% of the total cluster weight, then the shut down facility of the master node of that subcluster can automatically start sending shut down commands to the nodes of the other subcluster, because the other subcuster can not outrank it.

In the example of FIG. 3, the shut down facility of node N3 has received the demand reports of node N4 and N5, which belong to the same subcluster. The sum of the local host weights of nodes N4, N5 and N3 is 3, which is greater than 50% of the total cluster weight of 5. Therefore, node N3 can immediately start sending shut down commands to nodes N1 and N2 of the subcluster SC1.

If the calculated subcluster weight is exactly 50% of the total subcluster weight and the total weight of a different subcluster is less than 50%, then the split-brain condition is assumed to be a three-way split. The master node of the 50% subcluster can immediately start sending shut down commands to all other nodes not in its subcluster or the nodes determined to be shut down. Still no other subcluster can outrank it.

In case of a split-brain condition resulting in two subclusters with 50% weight each, the subcluster which contains the lowest alphanumeric name begins sending shut down commands to the other subclusters first. The surviving subcluster will therefore contain the node with the lowest alphanumeric node name. It is also possible to use a parameter other than the node name in the case of an exactly 50% split.

A subcluster weight smaller than 50% for each subcluster can occur, if not all nodes send an advertisement report or declare a specific node as master. If the subcluster weight is smaller than 50%, each of the shut down facilities in the subcluster calculate a delay time. This delay time depends on the local host weight of the local node and also on the position of the node in the subcluster. Additionally, the delay time should include a value which is the sum of all timeouts of all shut down facilities to be used in the subcluster.

For example, in the subcluster SC1 the shut down facility SF of node N1 will wait for five seconds before starting the shut down commands. The shut down facility of node N2 in subcluster SC1 will wait for five seconds plus another two seconds representing the second position in the ranking of subcluster SC1. Finally, the shut down facility SF checks for an indicating signal. This signal indicates whether the shut down process of the nodes N3 to N5 to be shut down have already begun. If that is the case and all nodes to be shut down have sent their signal indicating the shutting down process the facility can stop here. If an indication signal is not received, then the shut down facility assumes that a prior shut down facility with a shorter delay time had some problems sending the shut down signal. It, therefore, starts immediately to shut down the nodes of the different subclusters. This is a failsafe mechanism.

Thus, the master node of a subcluster normally gets a shortest delay time compared to all other nodes in that subcluster. Hence, it will start sending the shut down commands to all other nodes before the delay time of any other node in that subcluster expires. Therefore, it is necessary to ensure that no shut down command was sent before starting the failsafe mechanism in other nodes. This will prevent a node from receiving two shut down commands in a short time normally causing panic or a computer crash on that node.

Figure 4:
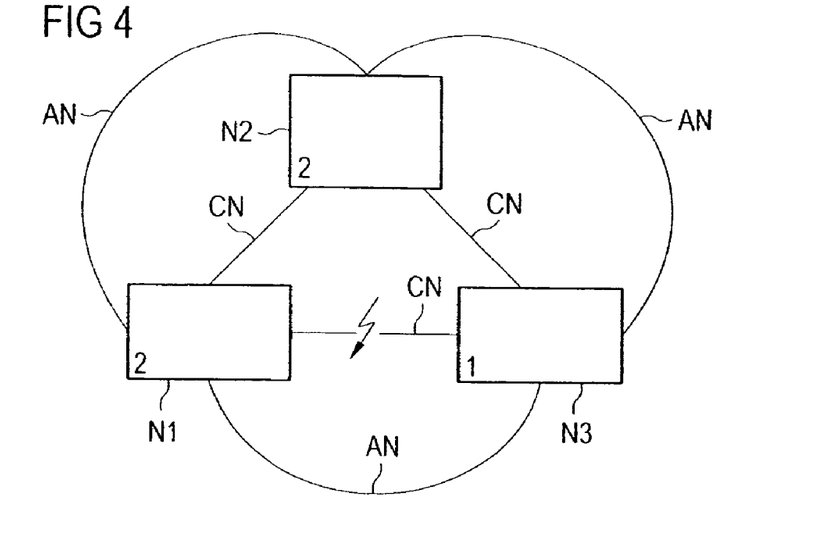
FIG. 4 shows a cluster system consisting of three nodes with a split brain condition.

Another embodiment of this invention is presented in FIG. 4. It shows a cluster comprising three different nodes N1, N2 and N3 which are connected to a cluster network CN and to an administrative network AN. As can be seen, a cluster communication between the node N1 and the node N3 is down while the communication between node N1 and node N2 as well as between node N2 and node N3 is operational. In this embodiment of the invention the cluster foundation of the node N1 and the node N3 will not receive heartbeat messages from each other and will, therefore, send a failure indicator for the other node at about the same time to the shut down facility SF. However, the node N2 can still communicate with the node N1 and the node N3 and, therefore, receives no failure indicator.

Figure 5:
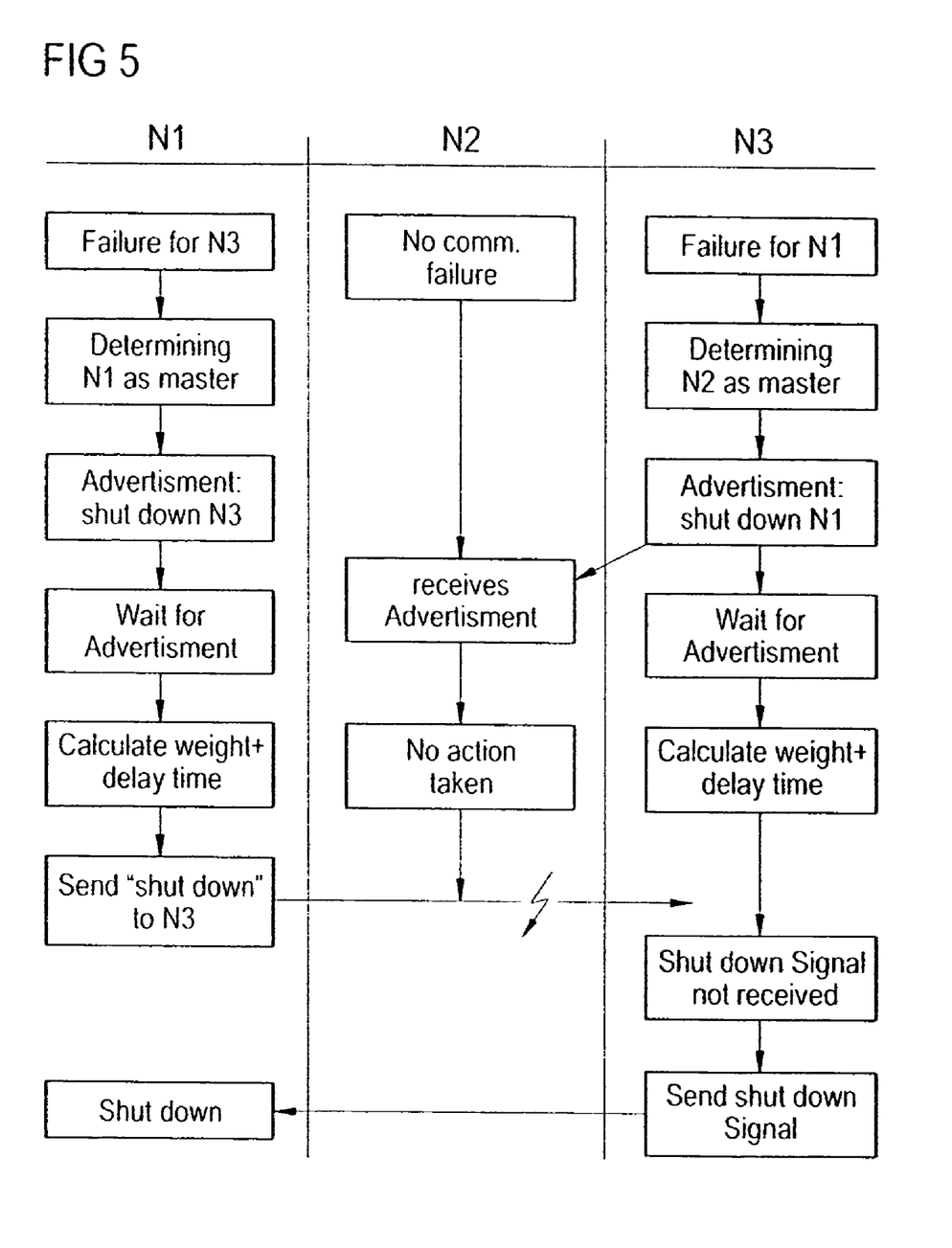
FIG. 5 shows the method steps in each node of the cluster in the previous figure.

FIG. 5 shows an overview of the actions taken by the shut down facilites SF of the nodes in the cluster. The shut down facility SF in node N1 will first determine node N3 as the node to be shut down, while the shut down facility of node N3 determines N1 as node to be shut down. Because no communication failure is reported with node N2, the shut down facility of node N1 assumes that node N2 is in the same subcluster. Since node N1 has a lower alphanumeric than node N2, the shut down facility of node N1 declares node N1 as master node.

At roughly the same time the shut down facility of node N3 assumes node N2 and node N3 to be in the same subcluster and declares node N2 as the master node of that subcluster. Both shut down facilities calculate their weight and generate the demand reports requesting a shut down progress for the other node. They will then send those demand reports over the administrative network AN. The shut down facility of node N2 receives those demand reports but does not take any action, because it can still communicate with both nodes and therefore will automatically belong to the surviving subcluster.

The shut down facilities delay for one to two seconds waiting for all demand reports sent to the other nodes. The shut down facility of N1 receives the demand report of node N3 and the shut down facility of N3 receives the demand report of the shut down facility of N1. The delay time is calculated based on the received demand reports.

The shut down facilities are considering only their own local host weight of 33% of the total cluster weight because the shut down facility of node N2 has not advertised. Thus, the shut down facilities of nodes N1 and N3 cannot assume that node N2 is part of their subcluster. The shut down facility of node N3, which declared node N2 as master node of their subcluster adds some additional time to the calculated delay time, due to the fact of not being the master node of the subcluster. Therefore, the total calculated delay time of the shut down facility of node N1 is shorter than the delay of shut down facility of node N3.

After the calculated delay time, the shut down facility SF of N1 sends the shut down command to node N3. Normally node N3 would start to shut down and no shut down command would be sent by the facility of N3. Nodes N1 and N2 would be the remaining nodes.

However, in this example, as can be seen from FIG. 5 the shut down command over the administrative network AN is not received by N3 due to a temporary failure of transmission. The delay time of node N3 expires without having received a shut down signal. The shut down facility SF of N3 now assumes that even though it is not the selected subcluster to survive the process, the highest weight subcluster, comprising of node N1 and node N2 is not performing the node elimination it should be doing. Therefore, it sends a shut down command to node N1, and node N1 shuts down. In this embodiment, though the split-brain condition is solved, the surviving subcluster of node N2 and node N3 is not the optimal subcluster due to its weight of 3 compared to the optimal subcluster weight of node N1 and node N2.

Figure 6:
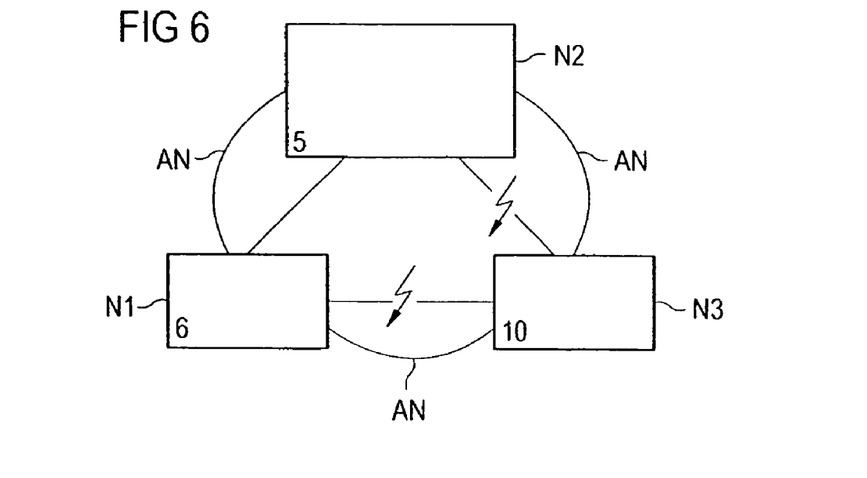
FIG. 6 illustrates the same cluster in a different split brain condition.
Figure 7:
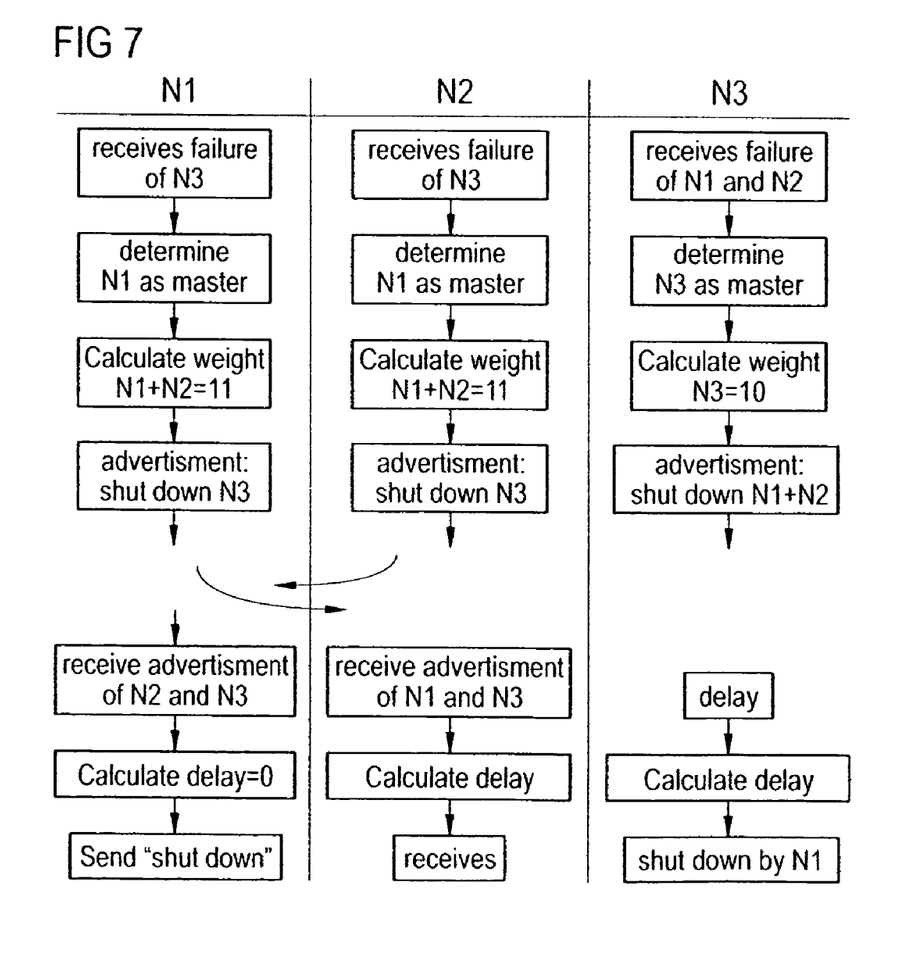
FIG. 7 shows the method steps for each node in the cluster of the previous figure.

FIG. 6 shows another aspect of the invention. A cluster consists of three nodes N1, N2 and N3 that are connected to a cluster network CN and an administrative network AN. The communication between the nodes N2 and N3 as well as between the nodes N1 and N3 is broken. The cluster foundations CF transmit a failure indicator after the heartbeat messages are not received for some time. The shut down facility of node N1 and node N2 receives a failure indicator for node N3, while the shut down facility of node N3 receives a failure indicator for node N1 and node N2.

In the next step the shut down facilities determine the masters of the respective subclusters. The node N1 is declared master by the shut down facilities of node N1 and node N2, and the shut down facility of node N3 declares itself as master, since communication with another node is not possible any more.

In the next step the total subcluster weight is calculated. In this case the total weight of the subcluster of node N1 and node N2 is 11 while the total weight of subcluster N3 is only 10. After that the demand reports are created. In this embodiment of the invention the shut down facility of node N2 will send the demand report only to the shut down facility of node N1, while the shut down facility of node N1 will only send its demand report to the facility of N2. It will not send the demand report to N3. The shut down facility of N3 does not send the demand reports to N1 or N2.

However, N3 will wait some time (such as the above-mentioned one to two seconds) before starting the calculation of the delay time to compensate for the time which is needed for receiving the demands. After that the delay time is calculated. The shut down facility of node N1 calculates the total subcluster weight to be greater than 50% of the total cluster weight. It sets its calculated time to zero and starts sending the shut down process to node N3 immediately. After some time node N1 and node N3 should receive a signal indicating that node N3 has been shut down. The split-brain condition is solved.

The described method in this invention is easily adaptable to different cluster systems. Furthermore for the calculation of the local as well as of the subcluster weight it is possible to include other weight values than just the local machine and the user application weight. In a preferred embodiment of the invention the machine weight of each node in the cluster system is written in a configuration file. It is useful to generate a "LEFTCLUSTER" signal by the cluster foundation CF which is broadcast to all other cluster nodes in the surviving cluster indicating the change of the cluster structure. The LEFTCLUSTER events indicates the finish of the shut down process and tells the RMS of the surviving nodes to restart applications if necessary.

In another embodiment of the invention, the delay time is calculated using the local host weight, the node name and the weight of the surviving subcluster. If not all cluster nodes in a subcluster have advertised their weights it is necessary to rely on an algorithm to allow the greatest weight subcluster to delay the least time. A possible solution for this delay is given by the formula:

$$delay = (maximum\ delay) * factor$$

The factor includes a relative ranking of the nodes in a subcluster as well as a relative subcluster weight compared to the total cluster weight. The formula should result in a delay time, where nodes in a subcluster of a small weight compared to the total cluster receive a very large delay time. Nodes of a subcluster whose relative weight is high will calculate a small delay time. The delay time between nodes in one subcluster remain different and depending on the relative ranking in that subcluster.

This invention makes the communication failure indicators as well as the shut down request local knowledge to one specific node of the cluster. Therefore it is necessary that determination of the membership of the subclusters must wait until all shut down requests have been advertised, sent and received. However it is not necessary to send demand reports to other nodes than the members of their own subcluster.

The scope of protection of the invention is not limited to the examples given hereinabove. The invention is embodied in each novel characteristic and each combination of characteristics, which includes every combination of any features which are stated in the claims, even if this combination of features is not explicitly stated in the claims.

We claim:

1. A method for a shut down process in a cluster system comprising a first node and at least one second node, said nodes connected to a communication network and an administrative network, and each node having an assigned name and an assigned host weight, the method being implemented in at least one of the first node and the at least one second node, the method comprising the steps of:
   a) inspecting a communication link via the communication network between the first and the at least one second node;
   b) determining, by the first node, which of the at least one second node is to be shut down after a failure of the communication link via the communication network between the first and the at least one second node;
   c) creating a demand report, by the first node, for the at least one second node determined to be shut down;
   d) sending the demand report to at least one node of the cluster system comprising the first and the at least one second node;
   e) calculating a delay time depending at least on the weight of the first node; and
   f) sending a shut down command, by the first node, over the administrative network to the at least one second node to be shut down after the expiry of the calculated delay time.

2. The method of claim 1, wherein inspecting the communication line comprises the steps of:
   listening to heartbeat messages sent by the at least one second node over the communication link, and
   setting a failure indicator, if the heartbeat messages of the at least one second node is not received during a specified amount of time.

3. The method of claim 1, wherein step b) comprises the steps of:
   waiting a specified amount of time after a failure of the communication link is received for an additional failure of the communication link between the first and a second of the at least one second node; and
   determining the at least one second node to be shut down.

4. The method of claim 1, wherein creating a demand report comprises the step of determining a node for which no failure of communication is reported as a master node.

5. The method of claim 4, wherein the master node is the node with a lowest alphanumeric name for which no failure of communication is reported.

6. The method of claim 4, wherein creating a demand report comprises the step of creating at least one list including the name of the first node, the name of the master node and the name of the at least one second node to be shut down.

7. The method of claim 6, wherein one list is created for each of the at least one second node to be shut down.

8. The method of claim 6, wherein the list includes the host weight of the first node.

9. The method of claim 1, wherein sending the demand report comprises sending the demand report to each node of the first and at least one second node in the cluster.

10. The method of claim 1, wherein in step e) the delay time is set to zero, if the host weight assigned to the first node is greater than 50% of the total weight of the first and the at least one second node.

11. The method of claim 1, wherein in step e) the delay time is set to zero if the sum of the weight of the first node and the nodes for which no failure of communication is received is greater than 50% of the total weight of the first and the at least one second node.

12. The method of claim 1, wherein sending a shut down command to the at least one second node in step f) is performed after lacking an indicator signal of the at least one second node indicating a shut down process.

13. The method of claim 1, wherein the host weight includes a predefined machine weight and a user application weight, which depends on executed application on the host.

14. The method of claim 1, wherein the demand reports are sent via a UDP protocol.

* * * * *

UNITED STATES PATENT AND TRADEMARK OFFICE
CERTIFICATE OF CORRECTION

PATENT NO. : 7,843,811 B2
APPLICATION NO. : 11/101720
DATED : November 30, 2010
INVENTOR(S) : Joseph W. Armstrong Page 1 of 1

It is certified that error appears in the above-identified patent and that said Letters Patent is hereby corrected as shown below:

On the Title Page, Item 63 should read:

--(63) Continuation of application No. ~~PCT/DE2003/010985~~ PCT/EP2003/010985, filed on Oct. 2, 2003.--

Signed and Sealed this
Ninth Day of July, 2013

Teresa Stanek Rea
*Acting Director of the United States Patent and Trademark Office*